(12) United States Patent
Konishi et al.

(10) Patent No.: US 7,122,582 B2
(45) Date of Patent: Oct. 17, 2006

(54) PRODUCTION METHOD OF POROUS SPHERICAL PARTICLES OF VINYL POLYMER

(75) Inventors: Tatsuya Konishi, Ibaraki (JP); Takeo Matsumura, Ibaraki (JP); Kenjiro Mori, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 11/143,384

(22) Filed: Jun. 2, 2005

(65) Prior Publication Data

US 2005/0272890 A1    Dec. 8, 2005

(30) Foreign Application Priority Data

Jun. 4, 2004    (JP) ............................. 2004/167854

(51) Int. Cl.
*C08F 2/20*    (2006.01)

(52) U.S. Cl. ..................... 521/150; 521/146; 526/202; 526/909

(58) Field of Classification Search ................ 521/146, 521/150; 526/202, 909
See application file for complete search history.

(56) References Cited

U.S. PATENT DOCUMENTS 5,641,847 A * 6/1997 Hozumi et al. .......... 526/328.5
5,880,240 A * 3/1999 Tsuno ........................ 526/334

FOREIGN PATENT DOCUMENTS

| JP | 52-47881 A | 4/1977 |
|---|---|---|
| JP | 52-47882 A | 4/1977 |
| JP | 52-51483 A | 4/1977 |
| JP | 01-146910 A | 6/1989 |
| JP | 03-64308 A | 3/1991 |
| JP | 3467399 B2 | 8/2003 |

OTHER PUBLICATIONS

Kuraray Poval Technical Data Sheet (undated).*
Guo et al., *Ind. Eng. Chem. Res.*, 42(22): 5559-5567 (2003).
Hosoya et al., *Journal of Chromatography A*, 853: 11-20 (1999).
Kobunshi (High Polymer), 36: 648-649 (1987).

* cited by examiner

*Primary Examiner*—Fred Teskin
(74) *Attorney, Agent, or Firm*—Leydig, Voit & Mayer, Ltd.

(57) ABSTRACT

The present invention provides a method of producing porous spherical particles, which includes suspension polymerization of a multifunctional monomer having two or more vinyl groups and a vinyl monomer having one vinyl group in an aqueous medium in the presence of a porogen and a distribution stabilizer, wherein the distribution stabilizer is polyvinyl alcohol having a saponification degree of 75 to 85 mol %. According to the method of the present invention, generation of particle agglomerates and large particles can be suppressed and porous spherical particles having a desired average particle size and a narrow particle size distribution can be conveniently produced.

7 Claims, 4 Drawing Sheets

PRODUCTION METHOD OF POROUS SPHERICAL PARTICLES OF VINYL POLYMER

FIELD OF THE INVENTION

The present invention relates to a production method of porous spherical particles of a vinyl polymer. More particularly, the present invention relates to a novel suspension polymerization method which can suppress generation of agglomerate particles and large particles and which can produce porous spherical particles having a desired average particle size in the below-mentioned range and narrow particle size distribution.

BACKGROUND OF THEE INVENTION

In recent years, porous spherical particles of a crosslinking polymer, particularly porous spherical particles having an average particle size of about 1 to 200 μm, have been widely used in the fields of toner, degloss for paint, gap adjusting material, filler for liquid chromatography, carrier for solid phase synthesis and the like. For these applications, porous spherical particles having a desired average particle size in the range of 1 to 200 μm, free of agglomerates particles and large particles, and having a narrow particle size distribution are extremely useful.

As a production method of porous spherical particles, seed polymerization, suspension polymerization and distribution polymerization have been conventionally used.

According to seed emulsion polymerization, particles having a narrow particle size distribution, i.e., monodisperse particles, can be obtained. However, to obtain about 5 μm particles, seed polymerization needs to be repeated plural times, and this method is not practical in view of many steps it requires. In practice, industrial production of particles of not less than 10 μm is difficult. According to a two-step swelling method, which is a modification of seed polymerization, particles of not less than 10 μm can be obtained. However, since it requires a swelling auxiliary agent, the swelling auxiliary agent needs to be removed after polymerization by washing, extraction and the like, the swelling operation itself requires time and thus, the method is poor in producibility. Moreover, particles having a uniform porous structure are difficult to obtain and reproducibility is hardly expected.

In the case of distribution polymerization, particles having an average particle size of 2 to 20 μm and a narrow particle size distribution can be obtained. However, due to the limitation on mechanism in that the particles are produced by the precipitation of polymer with the progress of polymerization, the polymerization system free of deformation of particle shape, variation of average particle size and extended range of particle size distribution is limited. Since the degree of crosslinking of the spherical particles produced by such a system is difficult, this method is not suitable for use requiring solvent resistance. While spherical particles of crosslinking polymer having a particle size of 0.5 to 5 μm can be produced by distribution polymerization of styrene-divinylbenzene in the presence of a high concentration distribution stabilizer, the resulting particles are non-porous.

On the other hand, production of porous spherical particles by suspension polymerization generally comprises mixing a monomer with what is called a porogen (i.e., organic solvent not involved in polymerization reaction and hardly soluble in aqueous medium, which dissolves monomer but does not dissolves polymer thereof), and stirring the mixture in an aqueous medium and the like. When a droplet containing a monomer is made small to a desired size in advance by stirring etc., spherical particles having a desired average particle size can be easily and economically produced. However, suspension polymerization affords particles having a wider particle size distribution, and agglomeration of particles and large particles tend to occur. Particularly, when porous spherical particles are produced by suspension polymerization, since a porous structure is constructed and the specific surface area rapidly expands with the progress of the polymerization, distribution stability of particles in an aqueous medium is markedly degraded, which easily produces agglomerates as compared to production of non-porous spherical particles. The presence of agglomerates particles and large particles, particularly amorphous agglomerates, causes rough surface, inconsistent design and the like, when used as a degloss for paint, and causes inconsistent filling property and inconsistent or degraded synthesizability when used for a carrier for solid phase. Therefore, agglomerates particles and large particles need to be removed from particles obtained by polymerization reaction, thus necessitating various labors for classification and the like.

There have been proposed various methods for solving the above-mentioned problems of suspension polymerization. For example, JP-A-52-47881, JP-A-52-47882 and JP-A-52-51483 disclose methods of narrowing the particle size distribution of the obtained polymer particles by using a nonionic surfactant as a suspension auxiliary agent during suspension polymerization of a vinyl monomer in the presence of a hardly soluble phosphate in an aqueous medium, and adding an anionic surfactant, a hardly soluble phosphate or a water-soluble polymer protective colloid during the polymerization. Moreover, JP-A-3-64308 discloses a method of narrowing the particle size distribution of the obtained polymer particles by adding an anionic surfactant and a hardly water-soluble organic salt during suspension polymerization of a styrene-based monomer in an aqueous medium containing a hardly water-soluble organic salt and a neutral water-soluble organic salt. However, since these methods use a non-ionic surfactant or a water-soluble organic salt as a suspension auxiliary agent, it is difficult to produce particles having a size of not more than 100 μm. In addition, these methods require addition of a distribution stabilizer such as anionic surfactant etc. during polymerization, besides addition of a distribution stabilizer such as a hardly water-soluble organic salt etc. in the initial stage of reaction, which means a step for the addition of several kinds of distribution stabilizers in two phases. Moreover, since these methods use a hardly water-soluble organic salt, solubilization and removal of the hardly water-soluble organic salt by an acid treatment etc. after polymerization become necessary, thus making the steps complicated. Furthermore, Japanese Patent No. 3467399 discloses a method of obtaining spherical microparticles free of agglomerate particles and large particles, which comprises adding an anionic surfactant during suspension polymerization of a vinyl monomer and a vinyl crosslinking agent in an aqueous medium containing a hardly water-soluble organic salt and an anion surfactant. This method certainly produces particles having a size of not more than 100 μm, but this method also requires addition of distribution stabilizer in two steps as mentioned above. In addition, since this method uses a hardly water-soluble inorganic salt solubilization and removal thereof is necessary, thus making the steps complicated.

SUMMARY OF THE INVENTION

It is therefore an object of the present invention to provide a production method of porous spherical particles of vinyl polymer, which is a novel suspension polymerization method capable of suppressing generation of agglomerate particles and large particles even if various components are added at once in a production step and capable of producing porous spherical particles having a desired average particle size in the range of 1 to 200 μm and narrow particle size distribution.

The present inventors have conducted intensive studies and found that the above-mentioned object can be achieved by a method of producing porous spherical particles by suspension polymerization of a multifunctional monomer having two or more vinyl groups and a vinyl monomer having one vinyl group in an aqueous medium in the presence of a porogen and a distribution stabilizer, wherein the distribution stabilizer is polyvinyl alcohol having a saponification degree of 75 to 85 mol %, which resulted in the completion of the present invention.

Accordingly, the present invention provides the following.

(1) A method of producing porous spherical particles, which comprises suspension polymerization of a multifunctional monomer having two or more vinyl groups and a vinyl monomer having one vinyl group in an aqueous medium in the presence of a porogen and a distribution stabilizer, wherein the distribution stabilizer is polyvinyl alcohol having a saponification degree of 75 to 85 mol %.

(2) The method of the above-mentioned (1), wherein the porous spherical particles have an average particle size of 1 to 200 μm.

(3) The method of the above-mentioned (1) or (2), wherein the porous spherical particles have a specific surface area as determined by a BET method of 1 to 300 m²/g.

(4) The method of any of the above-mentioned (1) to (3), wherein the porous spherical particles have an average fine pore size as determined by mercury porosimetry of 1 to 200 nm.

(5) The method of any of the above-mentioned (1) to (4), wherein an amount of the multifunctional monomer having two or more vinyl groups relative to the total weight of the multifunctional monomer having two or more vinyl groups and the vinyl monomer having one vinyl group is 2 to 55 wt %.

(6) The method of any of the above-mentioned (1) to (5), wherein the vinyl monomer having one vinyl group is a styrene-based monomer.

(7) The method of any of the above-mentioned (1) to (6), wherein the porogen is used in a 0.1- to 2-fold amount by weight relative to the total weight of the multifunctional monomer having two or more vinyl groups and the vinyl monomer having one vinyl group.

(8) The method of any of the above-mentioned (1) to (7), wherein the polyvinyl alcohol has an average degree of polymerization of 500 to 3000.

Figure 1:
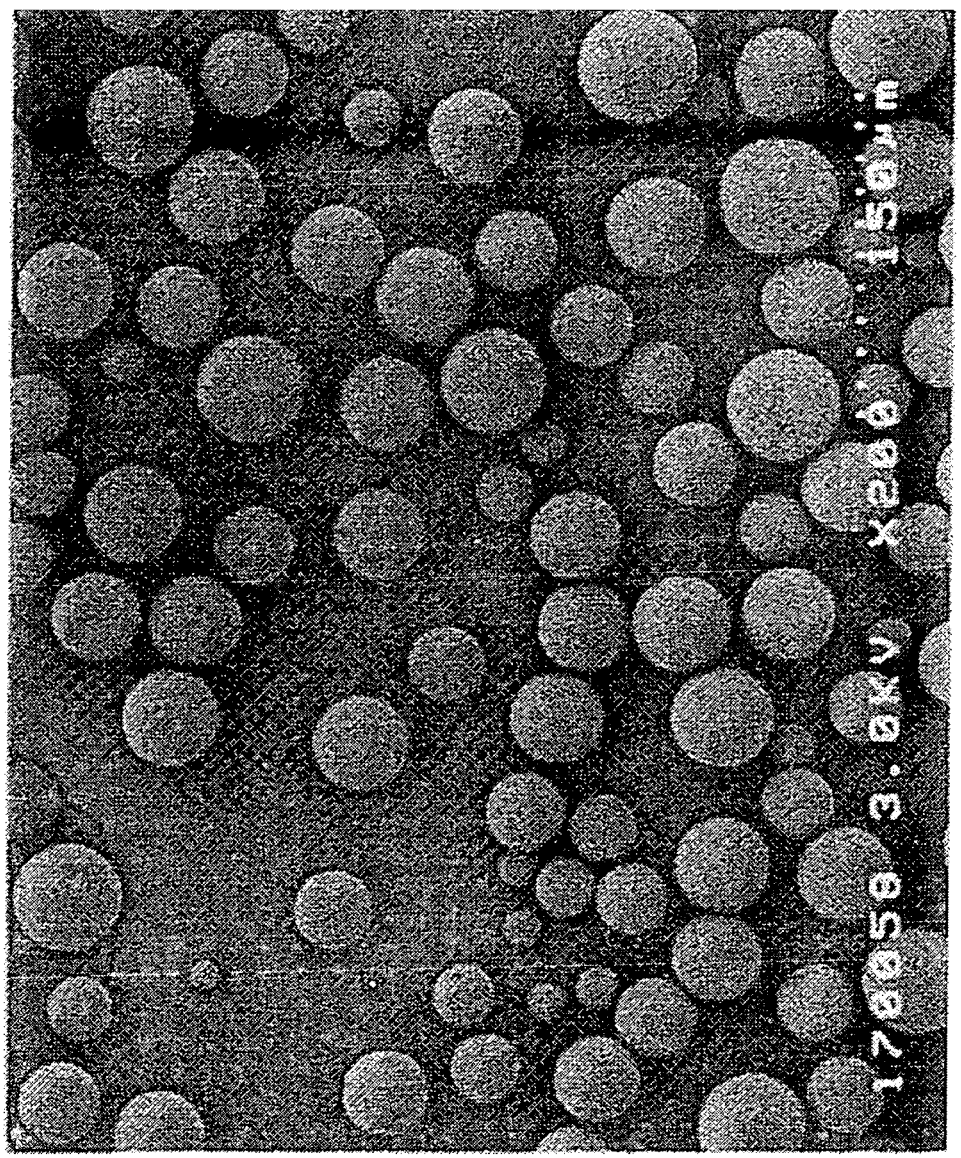
FIG. 1 is a photograph of the particles obtained in Example 1 (the present invention).

According to the method of the present invention, generation of particle agglomerates and large particles can be suppressed and porous spherical particles having a desired average particle size in the range of 1 to 200 μm and a narrow particle size distribution can be conveniently produced. Particularly, according to the method of the present invention, since generation of particle agglomerates and large particles in suspension polymerization can be suppressed, a conventionally necessary treatment to remove agglomerate particles and large particles after polymerization reaction becomes unnecessary, and even when a treatment to remove agglomerate particles and large particles is applied after polymerization reaction, the treatment time can be shortened than conventional cases. In addition, since the method of the present invention only requires addition of various components such as distribution stabilizer and the like at once to the reaction system in an early stage of polymerization reaction, and is free of complicated treatment after polymerization reaction, as seen in conventional methods using a hardly water-soluble organic salt, the operation is easy.

DETAILED DESCRIPTION OF THE INVENTION

The vinyl monomer in the present invention is not particularly limited as long as it is a monomer having one vinyl group in a molecule. The vinyl monomer having one vinyl group in the present invention is hereinafter simply referred to as a "vinyl monomer". As the vinyl monomer in the present invention, for example, (meth)acrylic acid alkyl ester, aromatic vinyl monomer, vinyl acetate, acrylonitrile and the like can be mentioned. As the (meth)acrylic acid alkyl ester, for example, esters obtained from straight chain or branched chain monovalent alcohol having an alkyl group having 1 to 10 carbon atoms and acrylic acid or methacrylic acid and the like can be mentioned, and, for example, methyl acrylate, butyl acrylate, 2-ethylhexyl acrylate, methyl methacrylate, butyl methacrylate, hexyl methacrylate and the like can be specifically mentioned. As the aromatic vinyl monomer, a 5- or 6-membered aromatic ring optionally containing, as a ring-constituting atom, hetero atom such as nitrogen atom and the like besides carbon atoms, which has one vinyl group in a molecule can be mentioned. The aromatic ring optionally further has substituents such as methyl group, acetoxy group and the like. As the aromatic vinyl monomer, for example, styrene monomers (e.g., styrene, 3-methylstyrene, 4-methylstyrene, 2,4-dimethylstyrene, 2,5-dimethylstyrene, α-methylstyrene, 3-ethylstyrene, 4-ethylstyrene, 2-acetoxystyrene etc.), vinylpyridine and the like can be specifically mentioned. The vinyl monomer may be used alone or in a mixture of two or more thereof. As the vinyl monomer, aromatic vinyl monomer (particularly styrene monomers such as styrene, 3-methylstyrene, 4-methylstyrene, 2,4-dimethylstyrene, 2,5-dimethylstyrene, α-methylstyrene, 3-ethylstyrene, 4-ethylstyrene, 2-acetoxystyrene and the like) and a mixture of styrene and acrylonitrile are preferable.

The effect of the present invention is particularly remarkable in the suspension polymerization of aromatic vinyl monomer and the below-mentioned multifunctional monomer having two or more vinyl groups.

In the present invention, the multifunctional monomer having two or more vinyl groups (hereinafter to be simply referred to as a "multifunctional monomer") is used as a crosslinking agent, and is not particularly limited as long as it has not less than 2, preferably 2 or 3 vinyl groups in a molecule and is capable of forming a crosslinking structure with the aforementioned vinyl monomer. For example, ethyleneglycol di(meth)acrylate, trimethylolpropane tri(meth)acrylate, divinylbenzene, trivinylbenzene and the like can be mentioned, with preference given to divinylbenzene.

The amount of the multifunctional monomer to be used is preferably about 2 to 55 wt %, more preferably about 4 to 40 wt %, relative to the total weight of a multifunctional monomer and a vinyl monomer.

When the amount of the multifunctional monomer to be used is less than 2 wt %, the solvent resistance, heat stability and porosity of the resulting particles are not sufficient, and a desired effect is hardly expected when used as a degloss for paint, filler for liquid chromatography, carrier for solid phase synthesis and the like. When it exceeds 55 wt %, a desired effect is hardly expected when used as a filler for liquid chromatography, carrier for solid phase synthesis and the like, because a distortion is produced due to excess crosslinking structure, the particles do not have sufficient strength and perfect spherical particles cannot be obtained.

In the present invention, the porogen is not particularly limited as long as it is not involved in the polymerization reaction, is hardly soluble in the below-mentioned aqueous medium, and dissolves a mixture of the aforementioned multifunctional monomer and a vinyl monomer but does not dissolve a polymer of these monomers. For example, aliphatic hydrocarbon (e.g., hexane, heptane, octane, isooctane, undecane, dodecane etc.), aromatic hydrocarbon (e.g., toluene, diethylbenzene etc.), aliphatic alcohol (e.g., 2-ethylhexanol, t-amylalcohol, nonylalcohol, 2-octanol, decanol, lauryl alcohol, cyclohexanol etc.) and the like can be mentioned. The porogen may be used alone or in a mixture of two or more thereof.

The amount of the porogen to be used is preferably 0.1- to 2-fold amount by weight, more preferably 0.5- to 1.5-fold amount by weight, relative to the total weight of the multifunctional monomer and vinyl monomer. When the amount of the porogen to be used is less than 0.1-fold amount by weight, the porosity of the obtained particles is not sufficient, and a desired effect is hardly expected when used as a toner, a degloss for paint, a filler for liquid chromatography, a carrier for solid phase synthesis and the like. When it exceeds 2-fold amount by weight, the porosity becomes too high to make particles insufficiently strong and perfect spherical particles difficult to obtain, as a result of which a desired effect is hardly expected when used for the above-mentioned applications.

In the present invention, polyvinyl alcohol having a saponification degree of 75 to 85 mol %, preferably 76.5 to 83 mol %, is used as a distribution stabilizer.

When the saponification degree is less than 75 mol %, the solubility of polyvinyl alcohol in an aqueous medium at high temperature is degraded and polyvinyl alcohol is precipitated during polymerization, thus often causing distribution failure or agglomerates. When the saponification degree exceeds 85 mol %, distribution stabilizing effect becomes insufficient, and agglomerate particles and large particles are easily produced.

Polyvinyl alcohol used as a distribution stabilizer in the present invention has an average degree of polymerization of preferably about 500 to 3000, more preferably about 500 to 2400.

When the average degree of polymerization is less than 500, a sufficient distribution stabilizing effect may not be attained, and since the viscosity of the aqueous medium dissolving polyvinyl alcohol becomes low, the resulting particles may have a too-large particle size. When the average degree of polymerization exceeds 3000, solubility in an aqueous medium becomes low, which may result in a failure to adjust to a desired concentration or difficulty in removing polyvinyl alcohol by washing with water after polymerization.

The amount of the polyvinyl alcohol to be used as a distribution stabilizer in the present invention is generally preferably about 0.7 to 22 wt %, more preferably about 1.3 to 17.5 wt %, relative to the total weight of a multifunctional monomer, a vinyl monomer and a porogen.

When the amount of the polyvinyl alcohol to be used is less than 0.7 wt %, a sufficient distribution stabilizing effect cannot be obtained, and large particles and agglomerate particles may be produced and the particle size of the obtained particles may become too large because of the low viscosity of the aqueous medium. When the amount exceeds 22 wt %, the viscosity of the whole polymerization reaction system may be too high, which may result in difficult filtration after polymerization or difficulty in removing polyvinyl alcohol by washing with water.

As the aqueous medium in the present invention, for example, water and the like can be mentioned.

The amount of the aqueous medium to be used is generally not less than 1-fold amount by weight, preferably not less than 1.5-fold amount by weight, relative to the total weight of a multifunctional monomer, a vinyl monomer and a porogen. When the amount of the aqueous medium to be used is less than 1-fold amount by weight, large particles and agglomerate particles may be produced.

The suspension polymerization can be performed by a method known per se, which comprises, for example, dissolving a distribution stabilizer in an aqueous medium, adding, to the obtained solution, a separately prepared mixed solution of a multifunctional monomer, a vinyl monomer, a porogen and a polymerization initiator, and stirring the mixture. The method of the present invention permits addition of such various components at once and can be performed conveniently. The method of the present invention is advantageous in that the operation of two step addition of distribution stabilizer and the like, as in the conventional methods, is not necessary. The polymerization initiator is not particularly limited and those conventionally used for radical polymerization can be used. For example, organic peroxides such as benzoyl peroxide, lauroyl peroxide, orthochlorobenzoyl peroxide, orthomethoxybenzoyl peroxide, 3,5,5-trimethylhexanoyl peroxide, t-butyl peroxy-2-ethylhexanoate, di-t-butyl peroxide and the like; azo compounds such as azobisisobutyronitrile, azobiscyclohexacarbonitrile, azobis(2,4-dimethylvaleronitrile) and the like; and the like can be mentioned. While the temperature of polymerization reaction can be appropriately determined depending on the kind of polymerization initiator and vinyl monomer, it is generally 25 to 100° C., preferably 50 to 90° C. The time of polymerization reaction is generally 3 to 48 hr, preferably 5 to 36 hr.

The polymerization vessel for the suspension polymerization is not particularly limited, and those conventionally used for suspension polymerization can be used. For suspension polymerization, the mixture is preferably stirred at an impeller tip speed ratio of not less than 0.7 m/s. When the rate is lower than 0.7 m/s, a distribution phase consisting of a vinyl monomer, a multifunctional monomer and a porogen may not be distributed well in an aqueous medium, or the particle size may become too large. The shape of the impeller may be any that is used conventionally, such as fan turbine wing, Pfaudler wing, paddle wing, turbine wing and the like, and the impeller may have a single impeller or plural impellers. The combined use with a baffle plate is not particularly limited.

The porous spherical particles can be isolated after completion of the polymerization reaction by, for example, cooling and filtering the reaction product, and washing and drying the residue.

According to the method of the present invention, porous spherical particles having an average particle size within the range of about 1 to 200 μm, preferably about 20 to 150 μm, can be produced. Particularly, in the method of the present invention, porous spherical particles having a desired average particle size in the range of 1 to 200 μm, preferably 20 to 150 μm, can be conveniently produced by appropriately determining the conditions of suspension polymerization such as tip speed ratio for stirring and the like, without a step of classification and the like to achieve a desired average particle size. The average particle size in the present specification is a median diameter determined by laser diffraction (scattering type).

Moreover, according to the method of the present invention, porous spherical particles having a narrow particle size distribution can be produced. The porous spherical particles produced by the present invention have a coefficient of variation (CV) of generally 15 to 35%, preferably 20 to 30%. As used herein, the coefficient of variation is measured by a laser diffraction (scattering type).

Furthermore, according to the method of the present invention, porous spherical particles having an average fine pore size within the range of about 1 to 200 nm, preferably about 20 to 150 nm can be produced. The average fine pore size in the present specification is measured by mercury porosimetry.

In addition, according to the method of the present invention, porous spherical particles having a specific surface area within the range of about 1 to 300 m$^2$/g, preferably about 20 to 200 m$^2$/g can be produced. In the present specification, the specific surface area is measured by a BET method using nitrogen as an adsorption gas.

EXAMPLES

The present invention is explained in detail in the following by referring to Examples, which are not to be construed as limitative.

Example 1

A 2 L separable flask equipped with a cooler, a stirrer and a nitrogen introducing tube was set in a thermostat water bath. Polyvinyl alcohol (manufactured by Wako Pure Chemical Industries, Ltd., special grade, average degree of polymerization about 1500, saponification degree 78 to 82 mol %, 16 g) was dissolved in water (1600 g), and the obtained aqueous solution was placed in the above-mentioned separable flask. Apart from this, a mixed solution of a monomer, a porogen and a polymerization initiator was prepared by mixing styrene (56.8 g), divinylbenzene (grade 55%, 24.5 g), 2-ethylhexanol (73.9 g), isooctane (31.7 g) and benzoyl peroxide (containing 25% of water, 1.76 g), and the mixed solution was placed in the above-mentioned separable flask. The mixture was stirred under a nitrogen stream at room temperature at a tip speed ratio of 2.0 m/s, heated to 80° C. and suspension polymerization was conducted for 7 hr. The reaction product was cooled, filtered, and the residue was washed and dried to give porous microparticles. The obtained particles had an average particle size of 40.5 μm and a coefficient of variation of 29.3%. Agglomerate particles were not found. The SEM photograph of the obtained particles is shown in FIG. 1.

Example 2

In the same manner as in Example 1 except that p-acetoxystyrene was used instead of styrene and polyvinyl alcohol (manufactured by Kuraray Co., Ltd., PVA-420, average degree of polymerization about 2000, saponification degree 78 to 81 mol %) was used instead of polyvinyl alcohol (manufactured by Wako Pure Chemical Industries, Ltd., special grade, average degree of polymerization about 1500, saponification degree 78 to 82 mol %), porous microparticles were obtained. The obtained particles had an average particle size of 39.5 μm and a coefficient of variation of 24.9%. Agglomerate particles were not found.

Example 3

In the same manner as in Example 1 except that a 4:1 mixture (weight ratio, 56.8 g) of styrene and acrylonitrile was used instead of styrene, polyvinyl alcohol (manufactured by Kuraray Co., Ltd., PVA-405, average degree of polymerization about 500, saponification degree 80 to 83 mol %) was used instead of polyvinyl alcohol (manufactured by Wako Pure Chemical Industries, Ltd., special grade, average degree of polymerization about 1500, saponification degree 78 to 82 mol %), the amount of polyvinyl alcohol was changed to 32 g and stirring was conducted at a tip speed ratio of 1.0 m/s, porous microparticles were obtained. The obtained particles had an average particle size of 72.5 μm and a coefficient of variation of 26.7%. Agglomerate particles were not found.

Comparative Example 1

Figure 2:
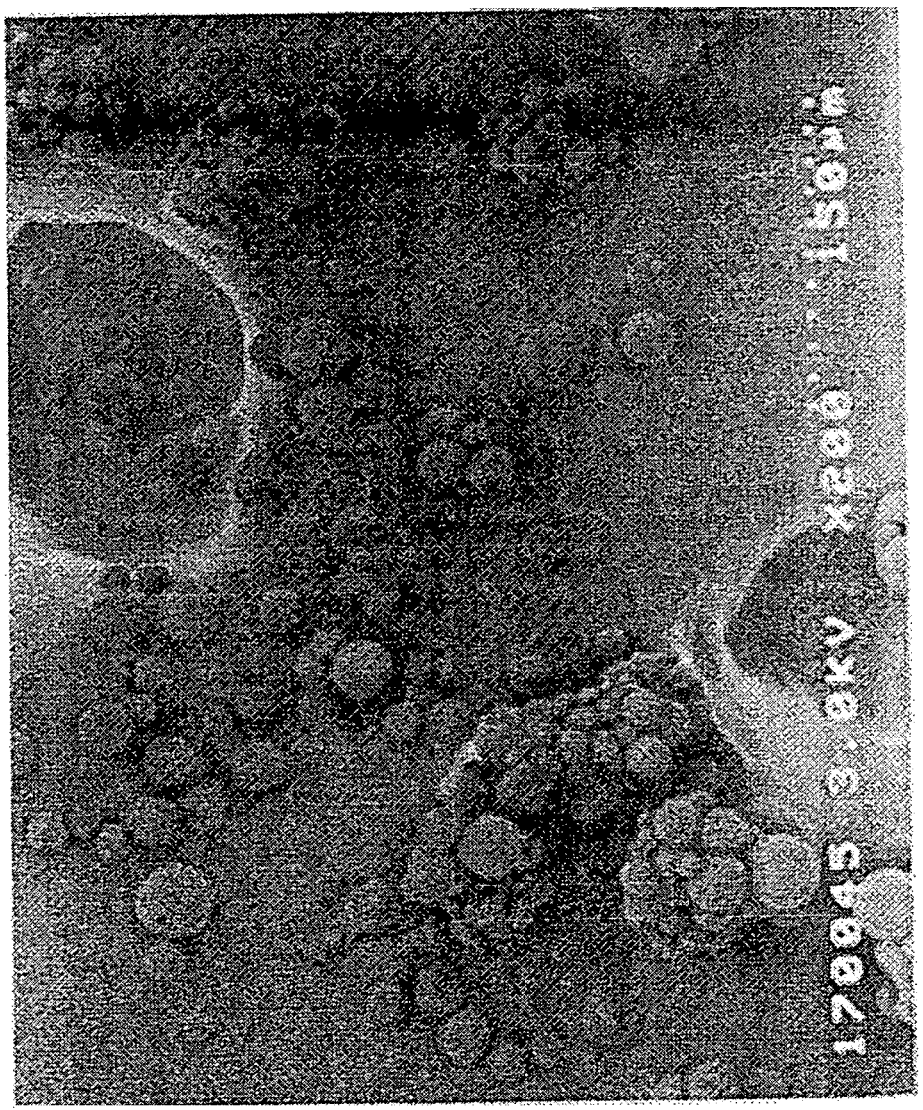
FIG. 2 is a photograph of the particles obtained in Comparative Example 1.

In the same manner as in Example 1 except that polyvinyl alcohol (manufactured by Wako Pure Chemical Industries, Ltd., average degree of polymerization about 500, saponification degree 86 to 90 mol %) was used instead of polyvinyl alcohol (manufactured by Wako Pure Chemical Industries, Ltd., special grade, average degree of polymerization about 1500, saponification degree 78 to 82 mol %), porous microparticles were obtained. The obtained particles were mostly agglomerated. The SEM photograph of the obtained particles is shown in FIG. 2.

Comparative Example 2

Figure 3:
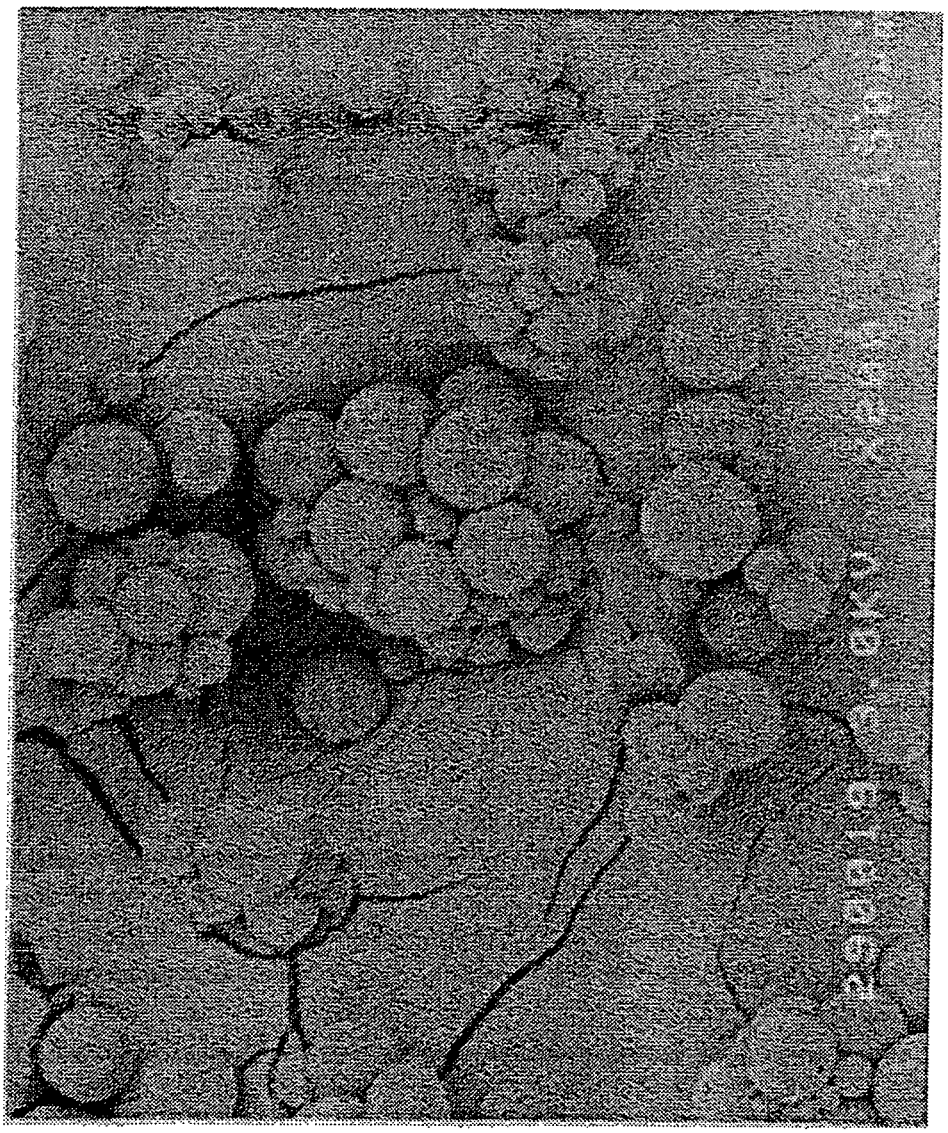
FIG. 3 is a photograph of the particles obtained in Comparative Example 2.

In the same manner as in Example 1 except that polyvinyl alcohol (manufactured by Kuraray Co., Ltd., PVA-505, average degree of polymerization about 500, saponification degree 72.5 to 74.5 mol %) was used instead of polyvinyl alcohol (manufactured by Wako Pure Chemical Industries, Ltd., special grade, average degree of polymerization about 1500, saponification degree 78 to 82 mol %), porous microparticles were obtained. The obtained particles were mostly agglomerated. The SEM photograph of the obtained particles is shown in FIG. 3.

Comparative Example 3

Figure 4:
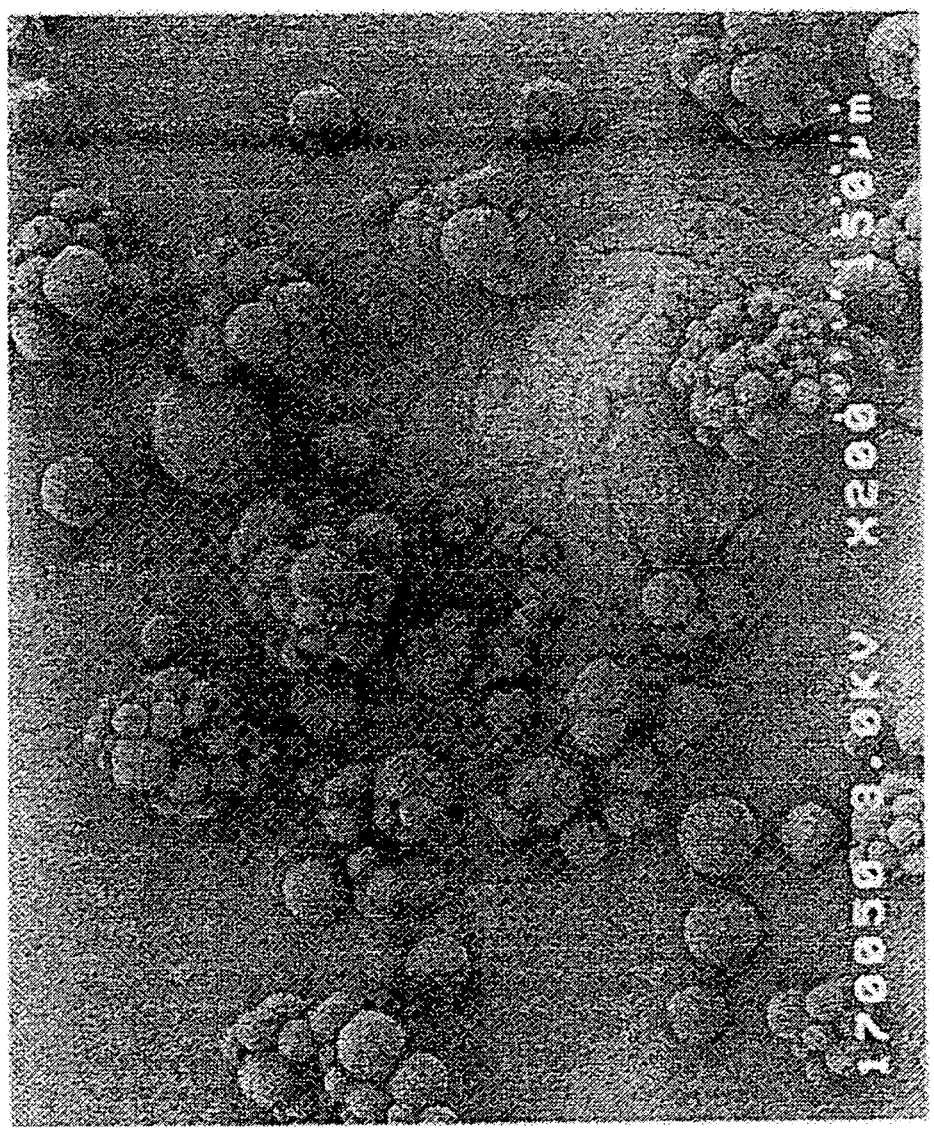
FIG. 4 is a photograph of the particles obtained in Comparative Example 3.

In the same manner as in Example 1 except that polyvinyl alcohol (manufactured by Kuraray Co., Ltd., PVA-224, average degree of polymerization about 2400, saponification degree 87 to 89 mol %) was used instead of polyvinyl alcohol (manufactured by Wako Pure Chemical Industries, Ltd., special grade, average degree of polymerization about 1500, saponification degree 78 to 82 mol %), the amount thereof was changed to 32 g and stirring was conducted at a tip speed ratio of 2.5 m/s, porous microparticles were obtained. The obtained particles were mostly agglomerated. The SEM photograph of the obtained particles is shown in FIG. 4.

Experimental Example 1

The porous microparticles obtained in the above-mentioned Example were evaluated for the following items and by the following methods. The results are shown in Table 1.

[Particle Size Distribution]
Apparatus used: LA-920 (manufactured by Horiba, Ltd.)
Method of measurement: laser diffraction/scattering type
Average particle size: median diameter

[Specific Surface Area]
Apparatus used: NOVA1200 (manufactured by QuantaChrome Co.)
Method of measurement: multipoint BET method
Adsorption gas: nitrogen

[Fine Pore Size Distribution]
Apparatus used: PoreMaster 60-GT (manufactured by QuantaChrome Co.)
Method for measurement: mercury porosimetry
Average fine pore size: median diameter

TABLE 1

| | | Examples (present invention) | | | Comparative Examples | |
|---|---|---|---|---|---|---|---|
| | | 1 | 2 | 3 | 1 | 2 | 3 |
| Vinyl monomer | | styrene | p-acetoxy-styrene | styrene/acrylonitrile | styrene | styrene | styrene |
| Multifunctional monomer | | divinyl-benzene | divinyl-benzene | divinyl-benzene | divinyl-benzene | divinyl-benzene | divinyl-benzene |
| Polyvinyl alcohol | Grade | Wako special grade | Kuraray PVA-420 | Kuraray PVA-405 | Wako | Kuraray PVA-505 | Kuraray PVA-224 |
| | Average molecular weight | 1500 | 2000 | 500 | 500 | 500 | 2400 |
| | Degree of saponification | 78–82% | 78–81% | 80–83% | 86–90% | 72.5–74.5% | 87–89% |
| | Amount used (g) | 16 | 16 | 32 | 16 | 16 | 32 |
| Aggregation | | Not observed | Not observed | Not observed | Observed | Observed | Observed |
| Average diameter (μm) | | 40.5 | 39.5 | 72.5 | — | — | — |
| CV (%) | | 29.3 | 24.9 | 26.7 | — | — | — |
| Specific surface area (m²/g) | | 87.2 | 7.5 | 47.6 | — | — | — |
| Average fine pore diameter (nm) | | 70.6 | 12.6 | 21.9 | — | — | — |

This application is based on patent application No. 2004-167854 filed in Japan, the contents of which are hereby incorporated by reference. All of the references cited herein, including patents, patent applications and publications, are hereby incorporated in their entireties by reference.

What is claimed is:

1. A method of producing porous spherical particles, which comprises suspension polymerization of a reaction system consisting essentially of:
    a multifunctional monomer having two or more vinyl groups and a styrene-based monomer,
    an aqueous medium,
    a porogen, and
    a distribution stabilizer,
    wherein the distribution stabilizer is polyvinyl alcohol having a saponification degree of 75 to 85 mol %, and the porous spherical particles have an average particle size of 20 to 150 μm.

2. The method of claim 1, wherein the porous spherical particles have a specific surface area as determined by a BET method of 1 to 300 m²/g.

3. The method of claim 1, wherein the porous spherical particles have an average fine pore size as determined by mercury porosimetry of 1 to 200 nm.

4. The method of claim 1, wherein an amount of the multifunctional monomer having two or more vinyl groups relative to the total weight of the multifunctional monomer having two or more vinyl groups and the vinyl monomer having one vinyl group is 2 to 55 wt %.

5. The method of claim 1, wherein the vinyl monomer having one vinyl group is a styrene-based monomer.

6. The method of claim 1, wherein the porogen is used in an amount of 0.1- to 2-fold amount by weight relative to the total weight of the multifunctional monomer having two or more vinyl groups and the vinyl monomer having one vinyl group.

7. The method of claim 1, wherein the polyvinyl alcohol has an average degree of polymerization of 500 to 3000.

* * * * *